United States Patent
Iwasaki

(10) Patent No.: US 8,648,923 B2
(45) Date of Patent: Feb. 11, 2014

(54) IMAGE PICKUP APPARATUS

(75) Inventor: Takahiro Iwasaki, Kiyose (JP)

(73) Assignee: Canon Kabushiki Kaisha, Tokyo (JP)

( * ) Notice: Subject to any disclaimer, the term of this patent is extended or adjusted under 35 U.S.C. 154(b) by 297 days.

(21) Appl. No.: 13/161,576

(22) Filed: Jun. 16, 2011

(65) Prior Publication Data

US 2011/0317037 A1 Dec. 29, 2011

(30) Foreign Application Priority Data

Jun. 28, 2010 (JP) ................. 2010-146288

(51) Int. Cl.
*H04N 5/232* (2006.01)

(52) U.S. Cl.
USPC ... 348/211.99; 348/143; 348/152; 348/211.1; 348/240.1; 348/240.2

(58) Field of Classification Search
USPC ............... 348/143, 152, 155, 211.99, 211.9, 348/211.1, 240.1, 240.2
See application file for complete search history.

(56) References Cited

U.S. PATENT DOCUMENTS 6,727,938 B1 * 4/2004 Randall ................. 348/143

2003/0035051 A1  2/2003  Cho et al.
2003/0235331 A1  12/2003  Kawaike et al.
2004/0196369 A1 * 10/2004  Fukasawa et al. ......... 348/155

FOREIGN PATENT DOCUMENTS

| CN | 101068342 A | 11/2007 |
| CN | 101667294 A | 3/2010 |
| JP | 2007-300531 | 11/2007 |
| WO | 2008/090908 A1 | 7/2008 |

* cited by examiner

*Primary Examiner* — Sinh Tran
*Assistant Examiner* — Paul Berardesca
(74) *Attorney, Agent, or Firm* — Cowan, Liebowitz & Latman, P.C.

(57) ABSTRACT

An image pickup apparatus controls a first mode for controlling a function to change an image pickup range of an image pickup unit in response to a received change request of the image pickup range to obtain image data of the changed image pickup range from the image pickup unit and a second mode for controlling an image process of a trimming and a magnification to the image data without performing the change of the image pickup range of the image pickup unit in response to the received change request of the image pickup range to generate image data of the image pickup range corresponding to the change request. The apparatus controls the change of the image pickup range of the image data in response to the change request of the image pickup range to select the first mode when an object detection process is not executed and select the second mode when the object detection process is executed.

8 Claims, 10 Drawing Sheets

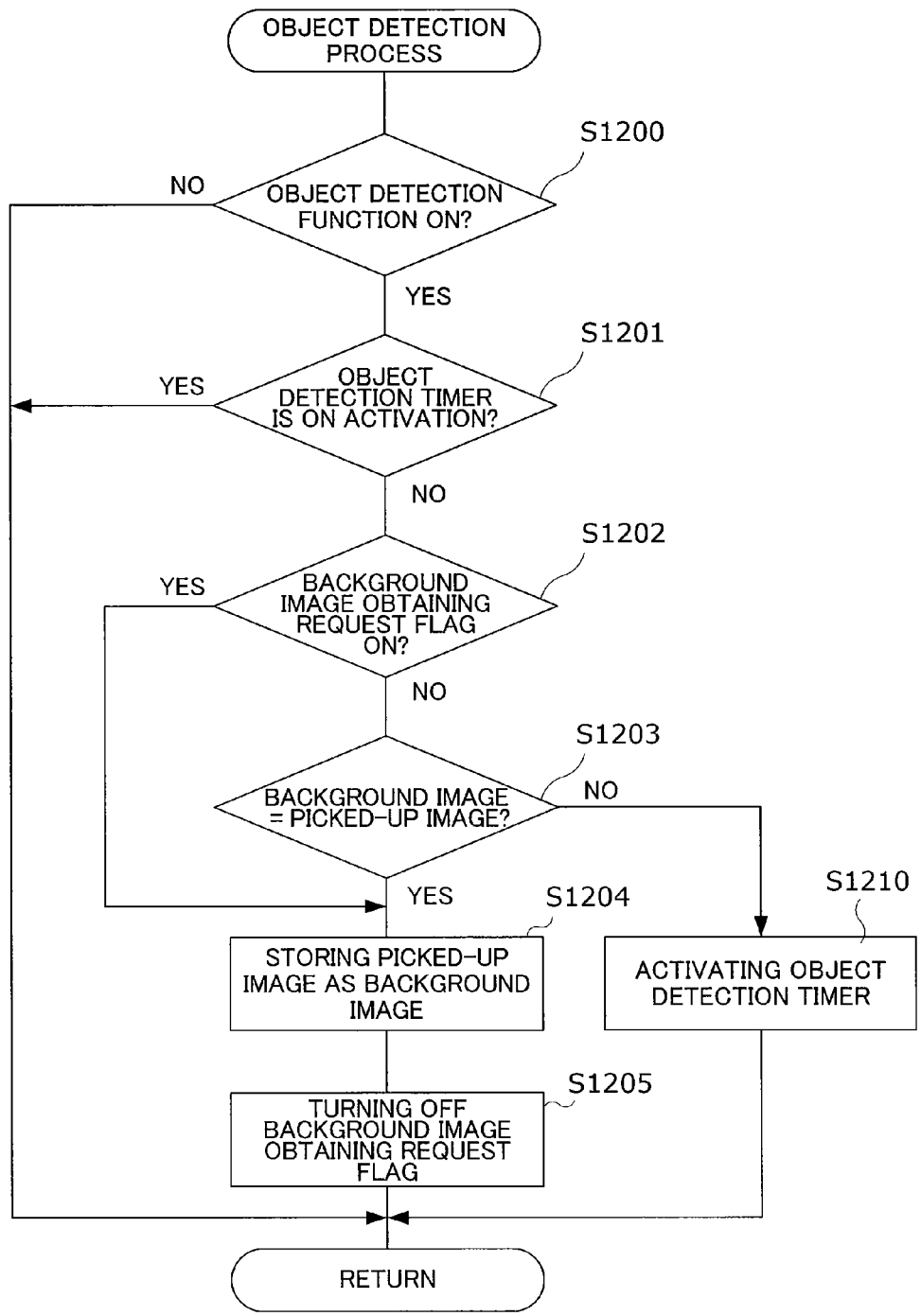

FIG. 6

IMAGE PICKUP RANGE CHANGE REQUEST

| IMAGE PICKUP RANGE CHANGE REQUEST COMMAND | PAN ANGLE | TILT ANGLE | ZOOM MAGNIFICATION |
|---|---|---|---|

OBJECT DETECTION FUNCTION SETTING REQUEST

| OBJECT DETECTION FUNCTION SETTING COMMAND | ON/OFF SETTING (1=ON/0=OFF) |
|---|---|

IMAGE PICKUP RANGE CHANGE CANCEL REQUEST

| IMAGE PICKUP RANGE CHANGE CANCEL EQUEST COMMAND |
|---|

OBJECT DETECTION NOTICE

| OBJECT DETECTION NOTICE | OBJECT INFORMATION (DEFFERENCE IMAGE/INFORMATION OF COORDINATES IN IMAGE PICKUP RANGE, SIZE, COLOR, SHAPE, ETC.) |
|---|---|

BACKGROUND IMAGE RE-OBTAINING WARNING

| BACKGROUND IMAGE RE-OBTAINING WARNING |
|---|

FIG. 7

| ARGUMENT OF IMAGE PICKUP RANGE CHANGE REQUEST COMMAND | PAN ANGLE | TILT ANGLE | ZOOM MAGNIFICATION |
|---|---|---|---|

  

| IMAGE PROCESS PARAMETER | HORIZONTAL-AXIS TRIMMING POSITION | VERTICAL-AXIS TRIMMING POSITION | TRIMMING MAGNIFICATION |
|---|---|---|---|

IMAGE PICKUP APPARATUS

BACKGROUND OF THE INVENTION

1. Field of the Invention

The present invention relates to an image pickup apparatus having an object detection function and, more particularly, to an image pickup apparatus having an image pickup range change function operative at the time of detecting an object.

2. Description of the Related Art

In recent years, an image pickup apparatus for use in security monitoring has a still image monitoring unit as a monitoring unit. According to such a unit, an object left in an image pickup range or an object taken away from the image pickup range is determined as a suspicious left or stolen object when a difference between a background image which has previously been stored and a current picked-up image continues for a predetermined period.

According to an object detecting apparatus of Japanese Patent Application Laid-Open No. 2007-300531, a background image is periodically updated, the background image picked up just before a person is detected and an image picked up just after no person is detected are compared, and an object that is being left can be detected at higher precision.

However, according to the related art disclosed in the above patent document, it is necessary as a prerequisite that ranges (angles of view) of the background image and the current picked-up image, which are compared in order to detect the presence or absence of the object, have to be the same. Therefore, there is such a problem that after the background image is obtained, if the user changes the image pickup range by panning, tilting, or zooming, a larger of a range of the picked-up image is determined as a difference from the background image. Or, there is also such a problem that if the background image is formed again after the image pickup range is changed, the object detected before the image pickup range is changed is stored as a new background image and thus cannot be determined as an object.

SUMMARY OF THE INVENTION

According to an aspect of the invention, an image pickup apparatus of the present invention, which has an image pickup unit having a function to change an image pickup range and generates image data from an image pickup signal obtained by the image pickup unit, comprises: a storage unit configured to store the image data as a background image; an object detection unit configured to compare the background image with current image data output from the image pickup unit and detect a difference between them as an object image, if the difference continues for a predetermined time; a reception unit configured to receive a change request of the image pickup range of the image data; a control unit configured to control a first mode for controlling a function to change the image pickup range of the image pickup unit in response to the received change request of the image pickup range to obtain the image data of the changed image pickup range from the image pickup unit and a second mode for controlling an image process for a trimming and a magnification to the image data in response to the received change request of the image pickup range without changing the image pickup range of the image pickup unit to generate image data of the image pickup range corresponding to the change request; and a transmission unit configured to transmit the image data obtained in the first mode or generated in the second mode, wherein the control unit controls the change of the image pickup range of the image data in response to the change request of the image pickup range received by the reception unit such that the control unit selects the first mode when the object detection unit does not execute the object detection process and selects the second mode when the object detection unit executes the object detection process.

Further features of the present invention will become apparent from the following description of exemplary embodiments with reference to the attached drawings.

BRIEF DESCRIPTION OF THE DRAWINGS

FIG. 3B is a flowchart for describing the operation of the image pickup apparatus in the first embodiment of the invention.

FIG. 6 is a diagram illustrating a construction of commands and notices which are used in the operation of the image pickup apparatus according to the embodiment of the invention.

FIG. 7 is a diagram illustrating a relation between the commands and image process parameters.

DESCRIPTION OF THE EMBODIMENTS

Exemplary embodiments of the invention will be described hereinbelow in detail with reference to the drawings.

Figure 1:
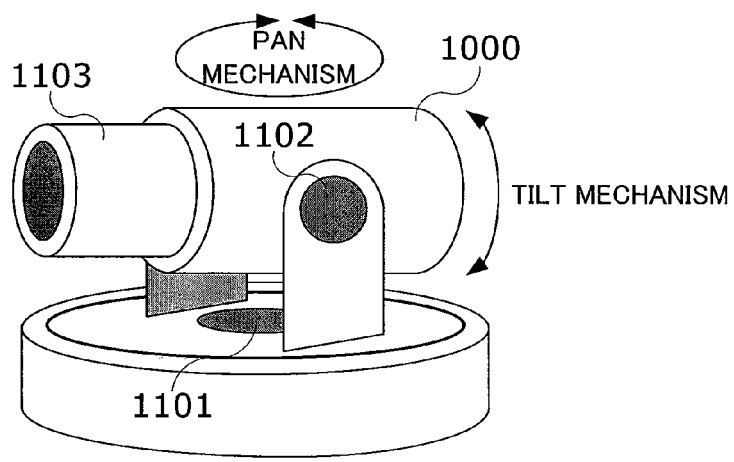
FIG. 1 is a conceptual diagram of an image pickup apparatus according to an embodiment of the invention.

FIG. 1 is a diagram illustrating a security camera according to the embodiments of the invention. A pan mechanism 1101 changes the direction of a lens in a pan direction. A tilt mechanism 1102 changes the direction of the lens in a tilt direction. A zoom mechanism 1103 is also provided.

Figure 2:
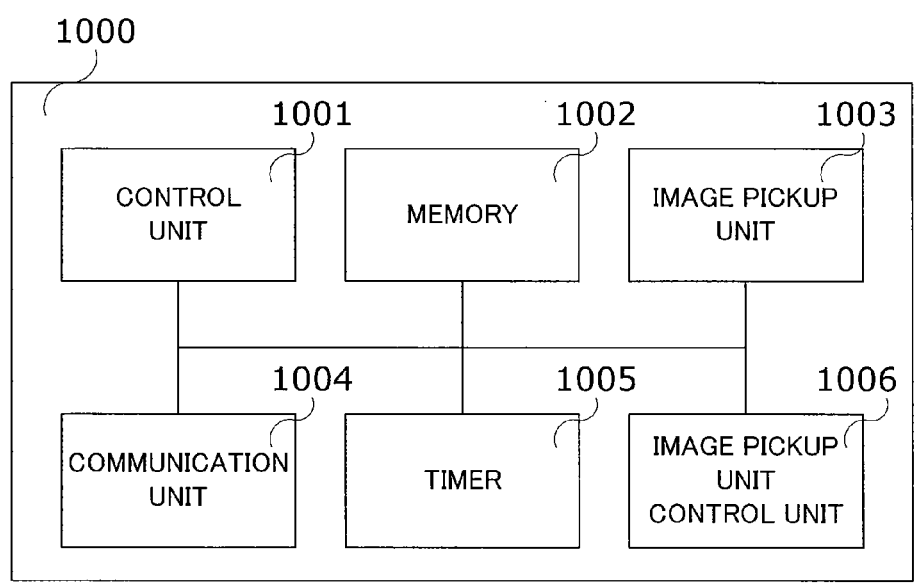
FIG. 2 is a block diagram of the image pickup apparatus according to the embodiment of the invention.

FIG. 2 is a block diagram illustrating an internal construction of the image pickup apparatus (hereinbelow, referred to as a security camera) according to the embodiment.

In FIG. 2, a control unit 1001 controls a whole security camera 1000. The control unit 1001 is constructed by, for example, a CPU.

A reference numeral 1002 denotes a memory. This memory 1002 is used as various kinds of data storage areas mainly such as: storage area of a program which is executed by the control unit 1001; work area for the execution of the program; storage area of a background image which is used by an object detection unit (which will be described hereinafter) to detect an object; and the like.

A reference numeral 1003 denotes an image pickup unit. This image pickup unit 1003 converts an analog signal (image pickup signal) obtained by photographing an object into digital data, executes a data compression process based on ADCT (Adaptive Discrete Cosine Transform) or the like, and generates a picked-up image (image data), to output to the memory 1002. After the picked-up image is output to the memory 1002, the image pickup unit 1003 issues an image obtaining event to the control unit 1001.

A reference numeral 1004 denotes a communication unit. This communication unit 1004 is used in the case where an object detection function setting request, an image pickup range change request, or an image pickup range change cancel request illustrated in FIG. 6 is received from an external device. The communication unit 1004 is also used in the case of transmitting a picked-up image, an object detection notice, or a background image re-obtaining warning illustrated in FIG. 6 to the external device. When the object detection function setting request, the image pickup range change request, or the image pickup range change cancel request is received, the communication unit 1004 issues an object detection function setting request receiving event, an image pickup range change request receiving event, or an image pickup range change cancel request receiving event corresponding to each of those requests to the control unit 1001.

A reference numeral 1005 denotes a timer. This timer 1005 is used to perform a time measurement of each of an object detection timer and an image pickup range change cancel request waiting timer. When a time-up occurs, the timer issues an event to the control unit 1001.

A reference numeral 1006 denotes an image pickup unit control unit. This image pickup unit control unit 1006 is used to control the pan mechanism 1101, tilt mechanism 1102, and zoom mechanism 1103 in response to the change request of the image pickup range of the lens, which is received by the communication unit 1004.

Although an internal construction of the security camera 1000 has been described above with reference to FIG. 2, the processing block illustrated in FIG. 2 is a diagram for describing an example of the exemplary embodiment of the security camera in the invention and is not limited to such an example. For instance, various modifications and changes such as a construction in which an audio input unit is provided or the like are possible within the scope of the essence of the invention.

Embodiment 1

The operation of the security camera 1000 according to the first embodiment of the invention will be described hereinbelow with reference to FIGS. 3A to 3D, 4A, 4B, 5A to 5F, 6, and 7. The operation is executed by a method whereby a control program stored in the memory 1002 or a control program installed from the outside is loaded into the control unit 1001 and executed. Therefore, the control program also constructs the invention.

Figure 3A:
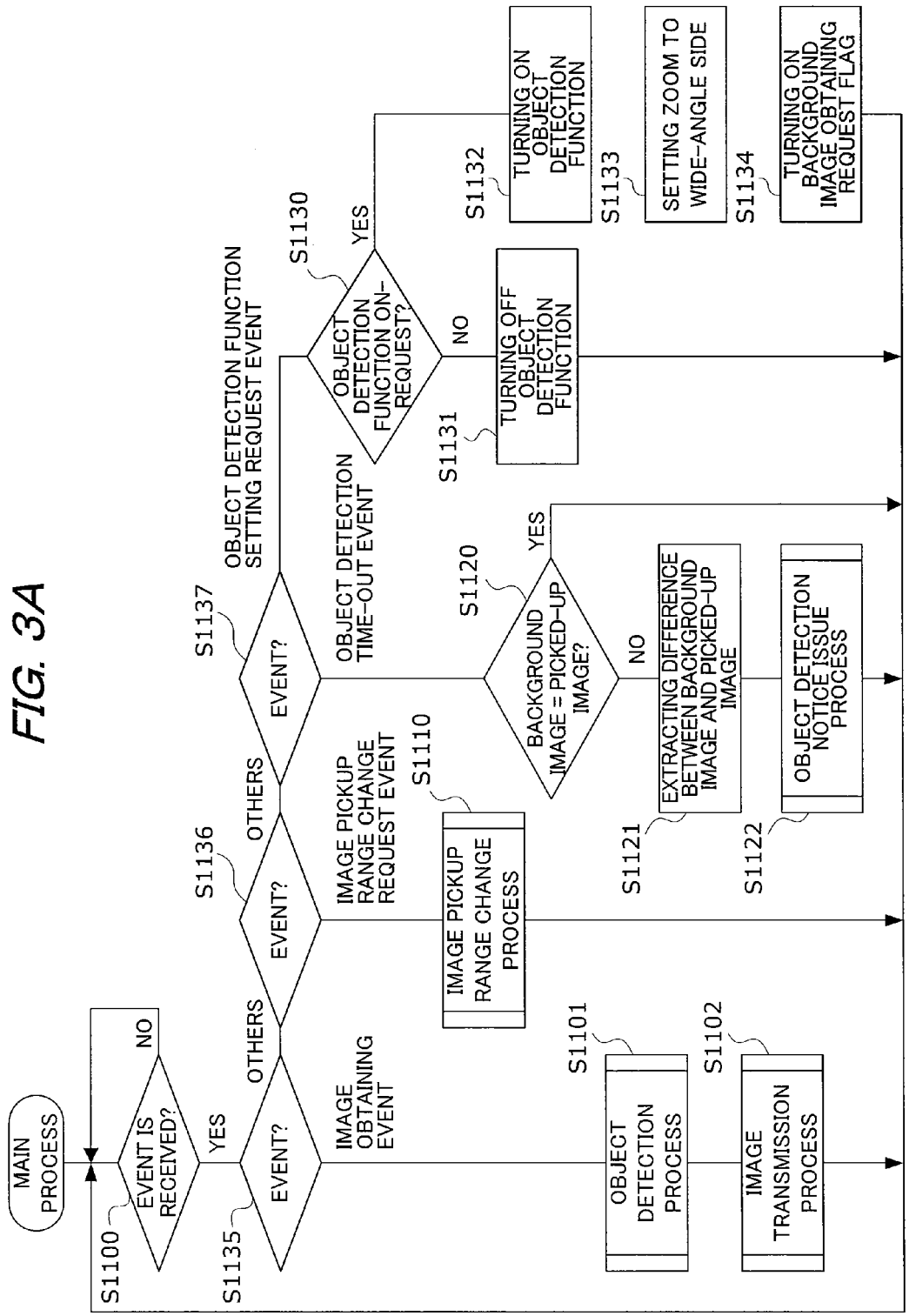
FIG. 3A is a flowchart for describing the operation of the image pickup apparatus in the first embodiment of the invention.

FIG. 3A is a flowchart for a main flow of the operation of the security camera according to the embodiment.

In step S1100, the control unit 1001 waits for an event.

The operation in the case where an image obtaining event is received in step S1100 will be described hereinbelow.

If it is determined in step S1135 that the image obtaining event is received, the control unit 1001 executes an object detection process in step S1101. The object detection process will be described in detail hereinafter.

The control unit 1001 executes an image transmission process in step S1102. The image transmission process will be described in detail hereinafter.

After step S1102 is executed, the control unit 1001 returns the process to step S1100.

Subsequently, a process in the case where the image pickup range change request receiving event is received in step S1100 will be described.

If it is determined in step S1136 that the image pickup range change request receiving event is received, the control unit 1001 executes an image pickup range change process in step S1110. This process will be described in detail hereinafter.

After step S1110 is executed, the control unit 1001 returns the process to step S1100.

Subsequently, a process in the case where an object detection time-out event is received in step S1100 will be described.

If it is determined in step S1137 that the object detection time-out event is received, step S1120 follows. The control unit 1001 discriminates whether or not there is a difference between a background image stored in the memory 1002 and a picked-up image which is output to the memory 1002 from the image pickup unit 1003. That is, whether or not the difference exists even after the elapse of a predetermined time after the object detection timer is activated (whether or not the difference exists continuously for the predetermined time) is discriminated.

Figure 5A:
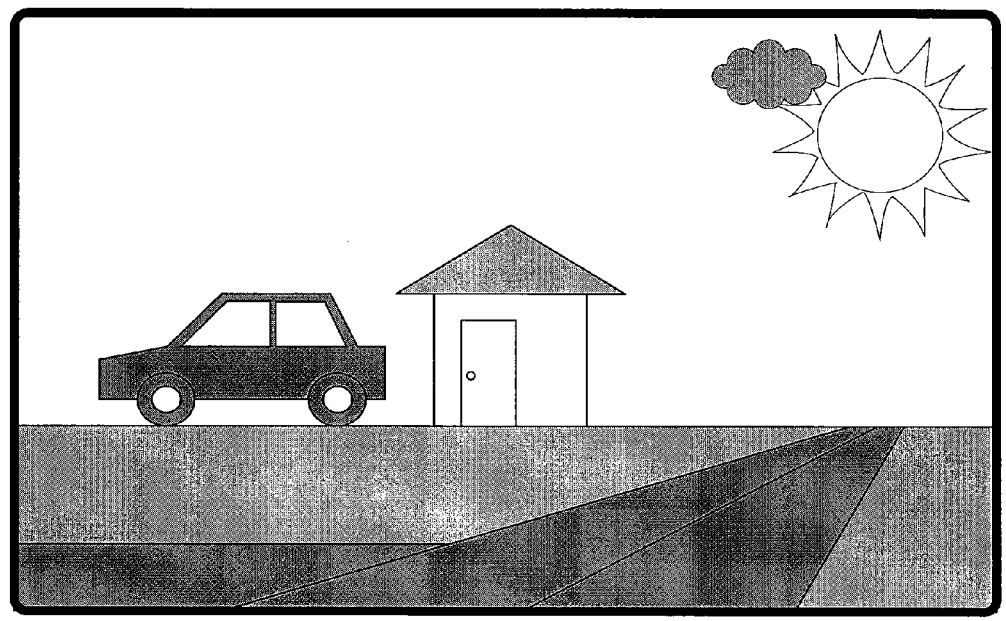
FIG. 5A is a diagram illustrating an example of a picked-up image of the image pickup apparatus according to the embodiment of the invention.

If there is no difference between the background image stored the memory 1002 and the picked-up image, the control unit 1001 returns the process to step S1100. In this instance, the case where there is no difference between the background image and the picked-up image is a case where, for example, the background image is as illustrated in FIG. 5A and the picked-up image is also as illustrated in FIG. 5A.

Figure 5B:
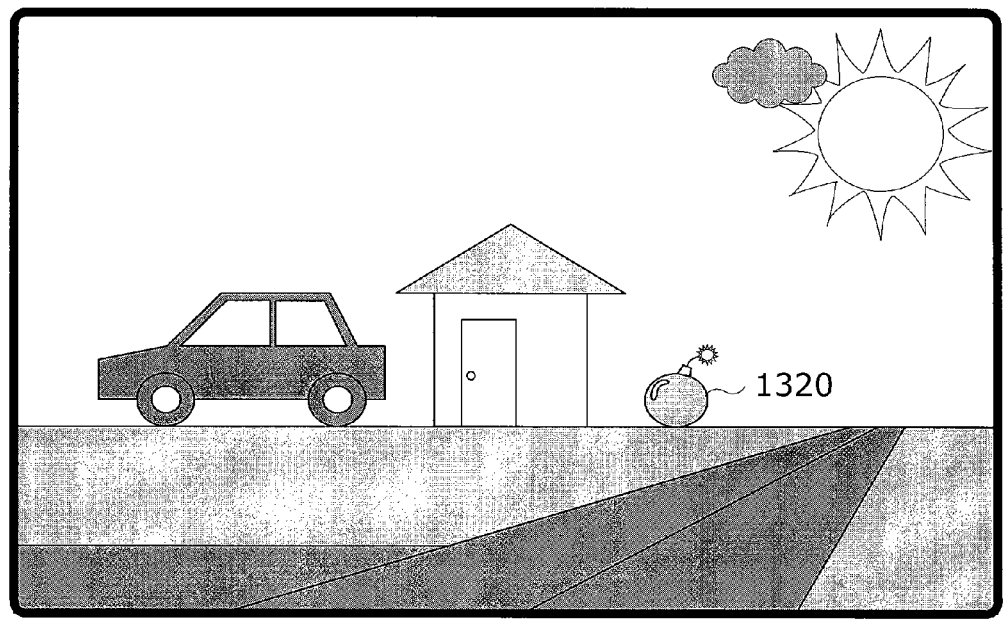
FIG. 5B is a diagram illustrating an example of a picked-up image of the image pickup apparatus according to the embodiment of the invention.

If the difference exists between the background image in the memory 1002 and the picked-up image, in step S1121, the control unit 1001 extracts a difference between the background image stored in the memory 1002 and the picked-up image which is output to the memory 1002 by the image pickup unit 1003, that is, information of the object. In this instance, the case where the difference exists between the background image and the picked-up image is such a case where the background image is as illustrated in FIG. 5A and the picked-up image is as illustrated in FIG. 5B. The difference between the background image and the picked-up image, that is, the information of the object is, for example, image information illustrated in FIG. 5E or coordinate information, a size, a color, and a shape in the image pickup range regarding the object obtained by the difference, for example, 1350 illustrated in FIG. 5E. However, another information can be also included as information of the object.

The control unit 1001 executes an object detection notice issue process in step S1122. The object detection notice issue process is the following process although it is not described in detail here. It is such a process that the control unit 1001 sets the information of the object extracted in step S1122 into an object detection notice illustrated in FIG. 6 and notifies a preset external device, a software module which is being executed in the security camera according to the embodiment, or the like. After that, the control unit 1001 returns the process to step S1100.

Subsequently, a process in the case where the object detection function setting request event was received in step S1100 will be described.

If it is determined in step S1137 that the object detection function setting request event is received, the control unit 1001 discriminates in step S1130 whether or not it indicates a request to turn on the object detection function (execution of the object detection process). If it is the ON-request, the control unit 1001 sets ON of the object detection function into the memory 1002 in step S1132.

In step S1133, the control unit 1001 instructs the image pickup unit control unit 1006 to operate the zoom mechanism 1103 to set a zoom into a maximum position (wide-angle end) on the wide-angle side. Although step S1133 may be omitted, by executing the above process, it can be attained when starting the object detection function that the background image which is stored into the memory 1002 can be maximized, that is, the image pickup range which can be changed without re-obtaining the background image can be maximized.

In step S1134, the control unit 1001 turns on a background image obtaining request flag and returns the process to step S1100.

If it is determined in step S1130 that the received event is not the request to turn on the object detection function, the control unit 1001 stores "OFF" of the object detection function into the memory 1002 in step S1131 and returns the process to step S1100.

The object detection process will be described with reference to FIG. 3B.

In step S1200, the control unit 1001 discriminates whether or not the object detection function is ON with reference to the memory 1002. If the object detection function is not ON, the control unit 1001 finishes the object detection process and returns the process to the main flow of FIG. 3A.

In step S1201, the control unit 1001 inquires of the timer 1005 to discriminate whether or not the object detection timer is on activation.

When the object detection timer is on activation, the control unit 1001 finishes the object detection process and returns the process to the main flow of FIG. 3A.

If the object detection timer is not on activation, the control unit 1001 discriminates in step S1202 whether or not the background image obtaining request flag is ON. If it is ON, the processing routine advances to step S1204.

In step S1203, the control unit 1001 discriminates whether or not there is a difference between the background image stored in the memory 1002 and the picked-up image which is output to the memory 1002 by the image pickup unit 1003.

If the difference exists between the background image and the picked-up image, the control unit 1001 in step S1210 causes the timer 1005 to start the object detection timer and finishes the object detection process.

If there is no difference between the background image and the picked-up image, in step S1204, the control unit 1001 stores the picked-up image which was output to the memory 1002 by the image pickup unit 1003 into the memory 1002 as a background image.

In step S1205, the control unit 1001 turns off the background image obtaining request flag and finishes the object detection process.

Figure 3C:
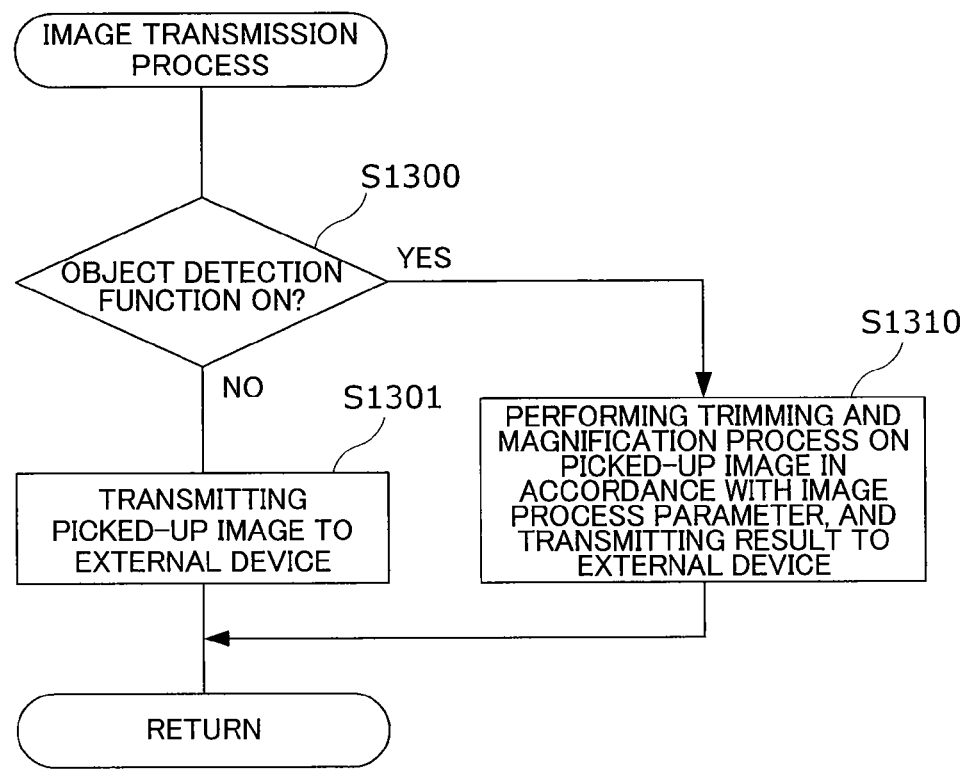
FIG. 3C is a flowchart for describing the operation of the image pickup apparatus in the first embodiment of the invention.

An image transmission process will be described with reference to FIG. 3C.

In step S1300, the control unit 1001 discriminates whether or not the object detection function is ON with reference to the memory 1002.

If the object detection function is ON, in step S1310, the control unit 1001 performs a trimming onto the picked-up image which is output to the memory 1002 by the image pickup unit 1003, in accordance with an image process parameter stored in the memory 1002. An image process for the magnification is executed so that the processed picked-up image has the same size as that before the trimming. The image subjected to the process is transmitted to the external device (for example, image recording display apparatus) through the communication unit 1004. After the transmission, the control unit 1001 finishes the image transmission process. That is, if the image process parameter is changed by the image pickup range change request (which will be described hereinafter), the image process of the picked-up image is executed in accordance with the changed image process parameter when transmission is performed. Therefore, when the object detection process is executed, even if the image pickup range change request is issued, the object detection process is executed by using the picked-up image in the image pickup range so far.

As illustrated in FIG. 7, the image process parameter includes a horizontal-axis trimming position, a vertical-axis trimming position, and a trimming size. They are calculated based on a pan angle, a tilt angle, and a zoom magnification of the image pickup range change request, respectively. For example, in the case of FIG. 5D, the horizontal-axis trimming position is horizontal-axis coordinates of a center point 1342 of an image 1341 subjected to the image process in a background image 1340. The vertical-axis trimming position is likewise a vertical-axis coordinate. The trimming size indicates a size ratio between a background image 1340 after the image process and the image 1341 after the image process.

Figure 5C:
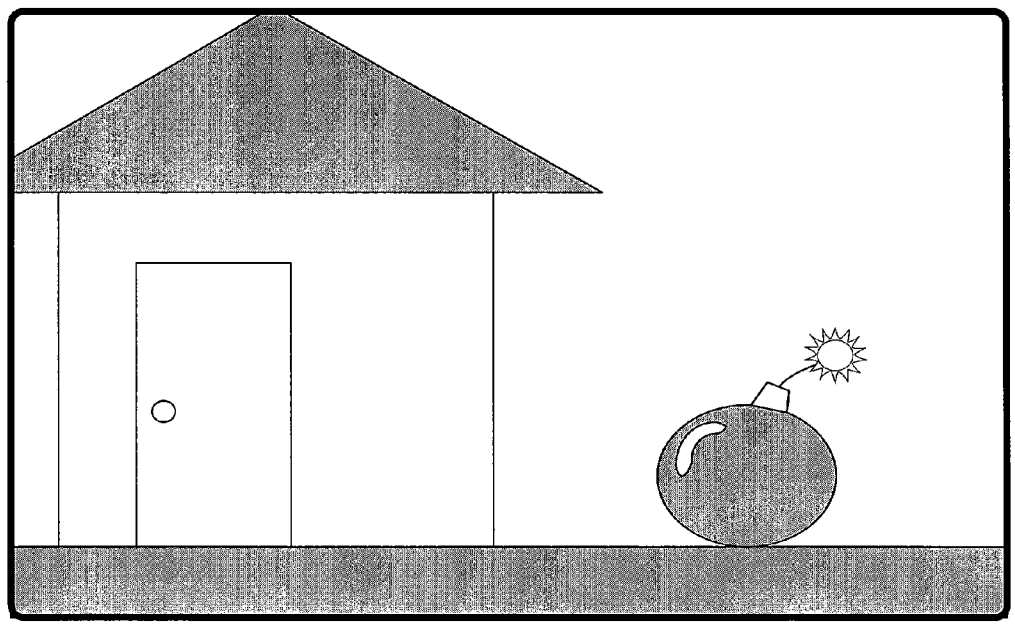
FIG. 5C is a diagram for describing an image process of the picked-up image according to the embodiment of the invention.
Figure 5D:
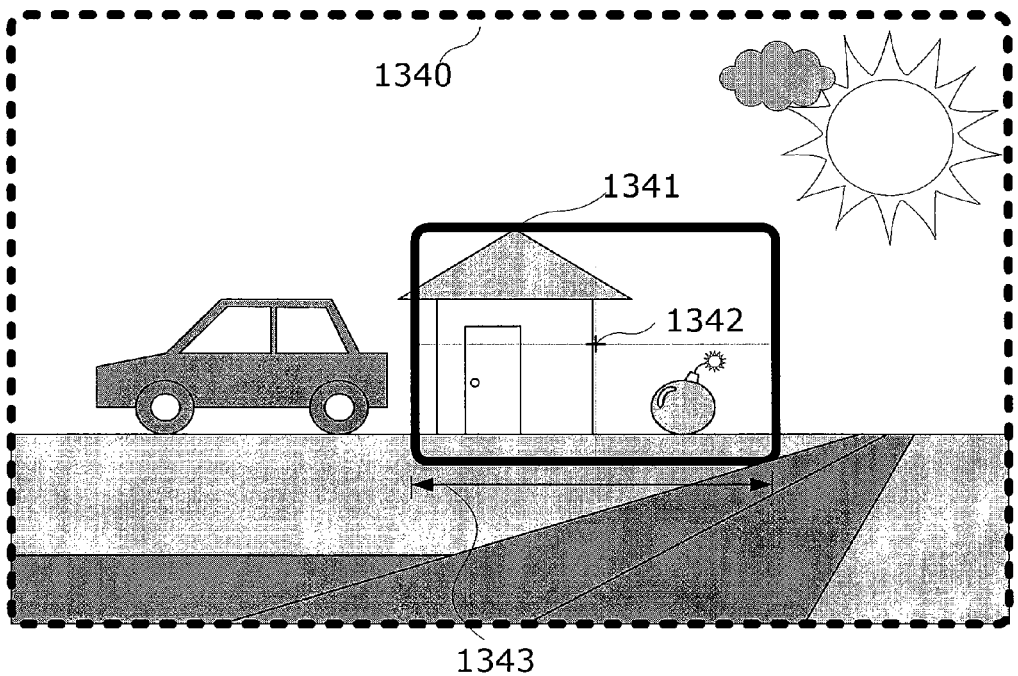
FIG. 5D is a diagram for describing the image process of the picked-up image according to the embodiment of the invention.
Figure 5E:
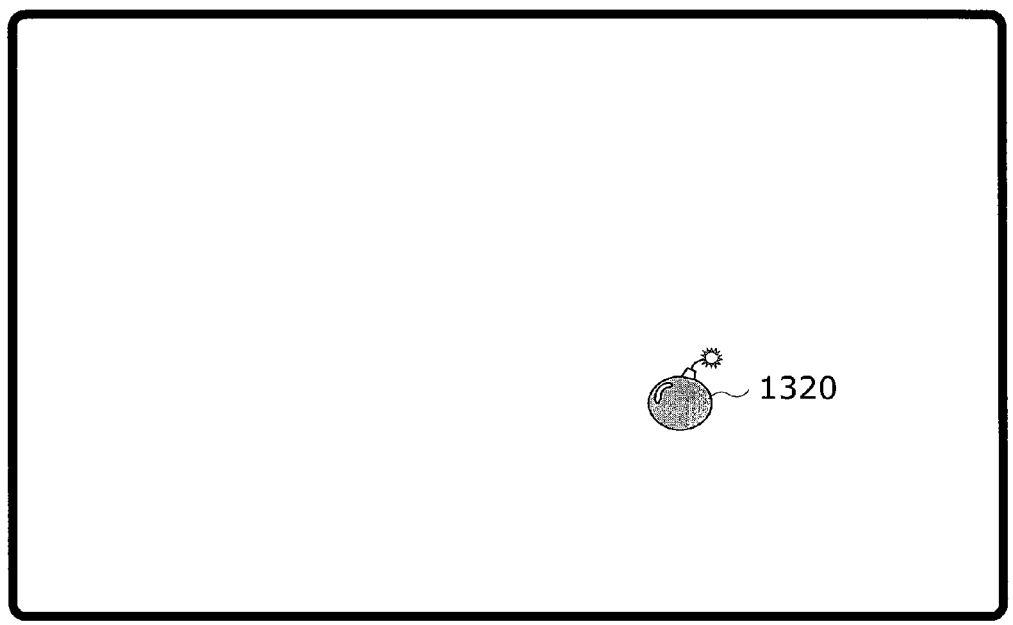
FIG. 5E is a diagram for describing image information of the picked-up image according to the embodiment of the invention.

The image process for the magnification denotes such a process that, for example, assuming that the picked-up image is an image in which the center point is denoted by 1342 in FIG. 5D, the image 1341 after the trimming process is magnified to a size as illustrated in FIG. 5C.

If the object detection function is OFF, in step S1301, the control unit 1001 transmits the picked-up image which is output to the memory 1002 by the image pickup unit 1003 to the external device. After the transmission, the control unit 1001 finishes the image transmission process.

Figure 3D:
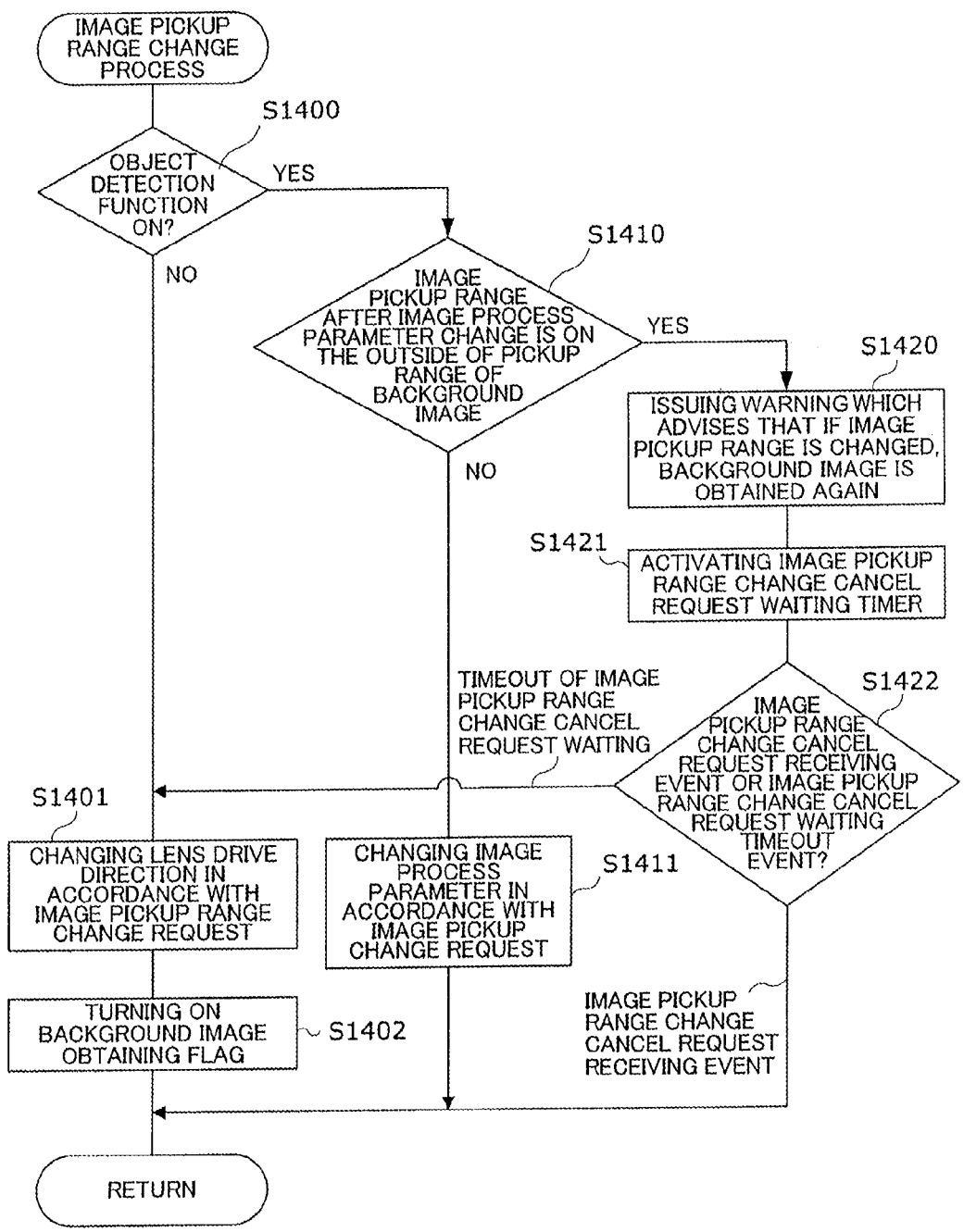
FIG. 3D is a flowchart for describing the operation of the image pickup apparatus in the first embodiment of the invention.

An image pickup range change process will now be described with reference to FIG. 3D.

In step S1400, the control unit 1001 discriminates whether or not the object detection function is ON, with reference to the memory 1002.

If the object detection function is OFF, in step S1401, the control unit 1001 causes the image pickup unit control unit 1006 to drive the pan mechanism 1101, tilt mechanism 1102, and zoom mechanism 1103 in accordance with the contents of the image pickup range change request (selection of the first mode).

In step S1402, the control unit 1001 turns on the background image obtaining request flag. Thus, in step S1204, the background image in the memory 1002 will be updated by the picked-up image which is to be obtained next by the image pickup unit 1003. Subsequently, the control unit 1001 finishes the image pickup range change process.

Figure 5F:
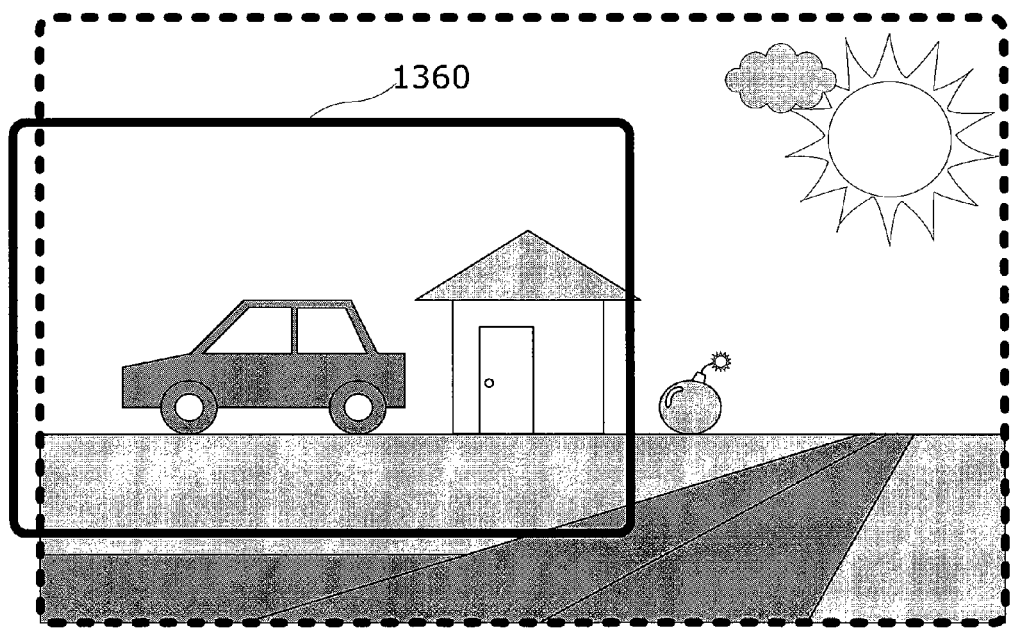
FIG. 5F is a diagram for describing the image process of the picked-up image according to the embodiment of the invention.

If the object detection function is ON, step S1410 follows (selection of the second mode). In this step, when the image process parameter is updated in accordance with the contents of the image pickup range change request, the control unit 1001 discriminates whether or not the image after the image process is on the outside of a range of the background image stored in the memory 1002. For example, assuming that the background image is as illustrated in FIG. 5A and the picked-up image is as illustrated in FIG. 5D or 5F, a case where the image obtained after the image process is executed in accordance with the updated image process parameter lies within the range of the background image is a case of 1341 in FIG. 5D. On the other hand, a case where the image is on the outside of the range is a case of 1360 in FIG. 5F.

If the image is not on the outside of the range of the background image, in step S1411, the control unit 1001 generates the image process parameter in accordance with the contents of the image pickup range change request, stores it into the memory 1002, and finishes the image pickup range change process. The image process parameter stored in the memory 1002 is used in the image process in step S1310 which is executed in the image transmission process when the object detection process is executed (ON). The picked-up image whose image pickup range is changed in response to the image pickup range change request is transmitted to the external device.

When the image after the process is on the outside of the background image, in step S1420, the control unit 1001 causes the communication unit 1004 to transmit a background image re-obtaining warning illustrated in FIG. 6 to a requesting source of the image pickup range change request.

In step S1421, the control unit 1001 causes the timer 1005 to start an image pickup range change cancel request waiting timer.

In step S1422, the control unit 1001 waits for the image pickup range change cancel request receiving event or the image pickup range change cancel request waiting time-out event. If the image pickup range change cancel request waiting time-out event is received, the control unit 1001 advances the process to step S1401. That is, the control unit 1001 performs a change in image pickup range by the pan, tilt, and zoom mechanisms. The picked-up image of the changed image pickup range is output from the image pickup unit 1003. If the image pickup range change cancel request receiving event is received, the control unit 1001 finishes the image pickup range change process.

According to the first embodiment of the invention mentioned above, when the object detection process is executed, even if the change request of the image pickup range is issued, the image pickup range of the picked-up image which is output from the image pickup unit is not changed. Therefore, a difference between the angles of view of the background image and the picked-up image does not occur during the execution of the object detection process. The erroneous detection of the object like a related art can be avoided.

Embodiment 2

In the embodiment 1, if the object detection function is ON, the change in image pickup range by the panning, tilting, and zooming is executed by the image process such as trimming or magnification, thereby allowing the image pickup range to be changed without re-obtaining the background image adapted to perform the object detection.

However, in the embodiment 1, even in the case where no object is detected actually although the object detection process is executed, the change in image pickup range is performed by the image process such as trimming or magnification. In the embodiment 2, even when the object detection function is ON, if no object is detected, the change in image pickup range by the pan, tilt, and zoom mechanisms is performed.

The second embodiment of the invention will be described hereinbelow with reference to FIGS. 1, 2, 3A, 3B, and 4A to 7. Since constructions illustrated in the drawings other than FIGS. 4A and 4B are similar to those in the embodiment 1, their description is omitted.

Figure 4A:
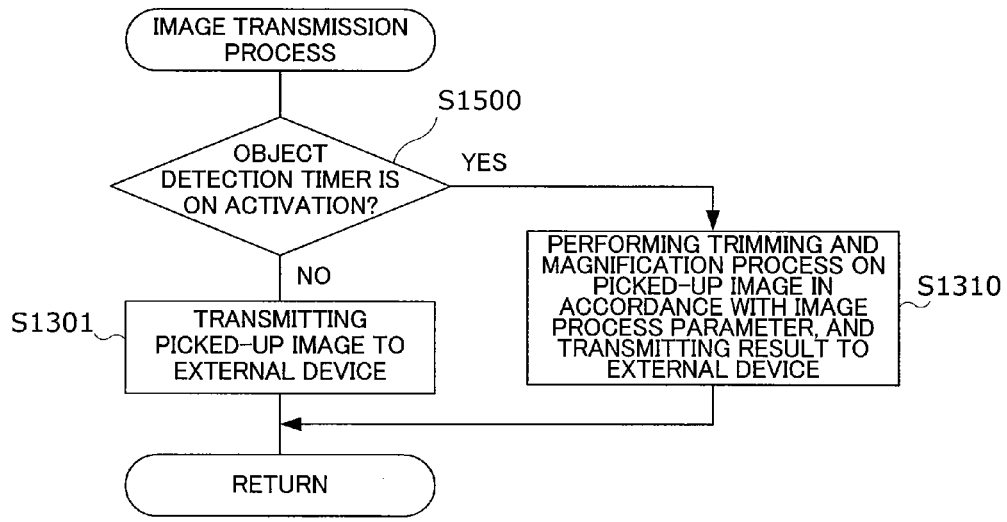
FIG. 4A is a flowchart for describing the operation of an image pickup apparatus in the second embodiment of the invention.

In step S1500 in FIG. 4A, the control unit 1001 inquires of the timer 1005 to discriminate whether or not the object detection timer is currently on activation. If the object detection timer is on activation (when the object is detected), the processing routine advances to step S1310. If it is not on activation, the processing routine advances to step S1301. Since subsequent processes are similar to those in FIG. 3C, their description is omitted.

Figure 4B:
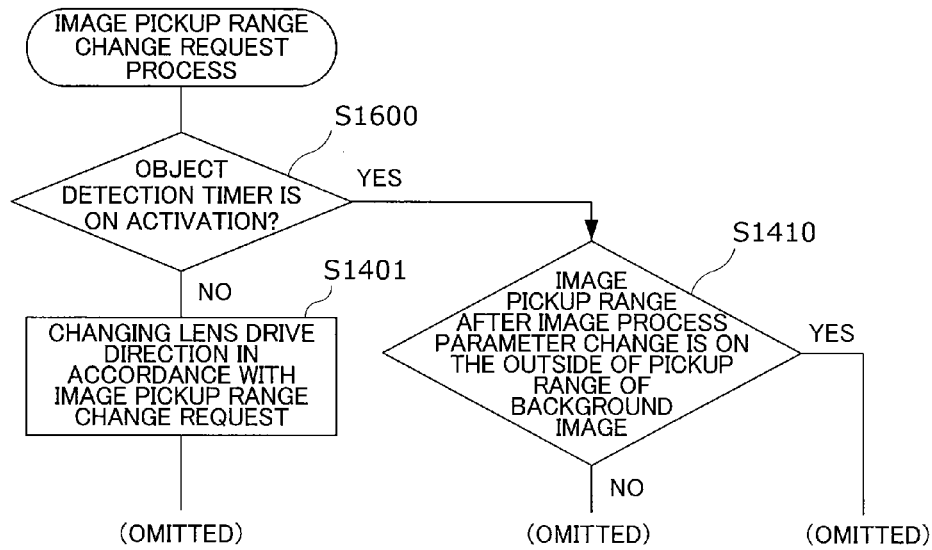
FIG. 4B is a flowchart for describing the operation of the image pickup apparatus in the second embodiment of the invention.

In step S1600 in FIG. 4B, the control unit 1001 inquires of the timer 1005 to discriminate whether or not the object detection timer is currently on activation. If the object detection timer is on activation, the processing routine advances to step S1410. If it is not on activation, the processing routine advances to step S1401. Since subsequent processes are similar to those in FIG. 3D, their description is omitted.

According to the foregoing second embodiment, even during the object detection process, if no object is detected, the change in image pickup range by the image process is not purposely performed, so that an operation load of the control unit 1001 can be reduced. Even during the execution of the object detection process, if no object is detected, the background image can be easily updated.

Although the operation of the security camera in which the invention is implemented is described above in the embodiments 1 and 2, the embodiments are not always limited to the foregoing examples but may be partially modified without departing from the spirit of the invention. For example, the following modifications are possible.

(1) In the case where the picked-up image is subjected to the image process such as trimming or magnification in accordance with the image process parameter and then transmitted to the external device, the object detection range may be limited to the range of the image subjected to the trimming process. That is, in the comparison of the picked-up image and the background image in steps S1203 and S1120, they may be compared only in the ranges after the trimming process according to the image process parameter was performed to both of those images.

By using such a method, a load of the CPU which is required for image comparison can be reduced.

(2) If the object detection function is turned on, a process for setting the zoom mechanism 1103 of the image pickup unit to the maximum value on the wide-angle side, that is, step S1133 may be omitted.

In the foregoing embodiment, the functions of the processes illustrated in FIGS. 3A to 4B are realized by a method whereby the control unit 1001 reads out a program for realizing the functions of the processes from the memory 1002 and executes the processes based on the program. However, the invention is not limited to such a method but the functions of all or a part of the processes illustrated in FIGS. 3A to 4B may be realized by dedicated hardware. The memory can be constructed by a magnetooptic disk device, a non-volatile memory such as a flash memory, a readable recording medium such as a CD-ROM, or a volatile memory other than a RAM. Further, the memory may be realized by a computer-readable/writable recording medium constructed by a combination of those devices.

The above processes may be executed by a method whereby the program for realizing the functions of the processes illustrated in FIGS. 3A to 4B is recorded into the computer-readable recording medium and the program recorded in the recording medium is read into a computer system and executed.

Other Embodiments

Aspects of the present invention can also be realized by a computer or a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-146288, filed on Jun. 28, 2010, which is hereby incorporated by reference herein in its entirety.

What is claimed is:

1. An image pickup apparatus which has an image pickup unit having a function to change an image pickup range and generates image data from an image pickup signal obtained by the image pickup unit, comprising:
   a storage unit configured to store the image data as a background image;
   an object detection unit configured to compare the background image with current image data output from the image pickup unit and detect a difference between them as an object image, if the difference continues for a predetermined time;
   a reception unit configured to receive a change request to change a current image pickup range of the image pickup unit to a new image pickup range of the image pickup unit;
   a control unit configured to control a first mode for controlling a function to change the current image pickup range of the image pickup unit to the new image pickup range in response to the received change request to obtain first image data having the new image pickup range from the image pickup unit and a second mode for controlling an image process for a trimming and a magnification of the image data in response to the received change request without changing the current image pickup range of the image pickup unit to generate second image data having an image pickup range corresponding to the change request; and
   a transmission unit configured to transmit the first image data obtained in the first mode or the second image data generated in the second mode,
   wherein the control unit controls the change of the image pickup range of the image pickup unit in response to the change request such that the control unit selects the first mode when the object detection unit does not execute the comparison between the background image and the current image data output from the image pickup unit and selects the second mode when the object detection unit executes the comparison between the background image and the current image data output from the image pickup unit.

2. An apparatus according to claim 1, wherein when the second mode is selected, if the new image pickup range requested in the change request exceeds a range of the background image, the control unit switches a mode to the first mode.

3. An apparatus according to claim 1, further comprising a warning unit, and
   wherein when the second mode is selected, if the new image pickup range requested in the change request exceeds a range of the background image, the control unit controls the warning unit so as to generate a warning before the change of the current image pickup range to the new image pickup range is performed.

4. An apparatus according to claim 1, wherein the control unit changes an angle of view of the image pickup unit to a wide-angle end before the object detection unit executes the comparison between the background image and the current image data output from the image pickup unit.

5. An apparatus according to claim 1, wherein even when the object detection unit executes the comparison between the background image and the current image data output from the image pickup unit, if it is not detected that the difference between the current image data and the background image continues for the predetermined time, the control unit selects the first mode, and if it is detected that the difference between the current image data and the background image continues for the predetermined time, the control unit selects the second mode.

6. A control method of an image pickup apparatus which has an image pickup unit having a function to change an image pickup range and generates image data from an image pickup signal obtained by the image pickup unit, comprising:
   storing the image data as a background image into a storage unit;
   comparing the background image with current image data output from the image pickup unit and detecting a difference between them as an object image, if the difference continues for a predetermined time;
   receiving a change request to chance a current image pickup range of the image pickup unit to a new image pickup range of the image pickup unit;
   controlling a first mode for controlling a function to change the current image pickup range of the image pickup unit to the new image pickup range in response to the received change request to obtain first image data having the new image pickup range from the image pickup unit and a second mode for controlling an image process for a trimming and a magnification to the image data in response to the received change request without changing the current image pickup range of the image pickup unit to generate second image data having an image pickup range corresponding to the change request; and
   transmitting the first image data obtained in the first mode or the second image data generated in the second mode,
   wherein the control step controls the change of the image pickup range of the image pickup unit in response to the change request such that the control step selects the first mode when the comparison between the background image and the current image data output from the image is not executed in the object detection step and selects the second mode when the comparison between the background image and the current image data output from the image is executed.

7. A non-transitory computer readable storage medium storing a program comprising a program code for causing a computer to function as each unit according to any one of claims 1-3, 4, and 5.

8. A non-transitory computer readable storage medium storing a program comprising a program code for causing a computer to execute the control method according to claim 6.

* * * * *